United States Patent Office.

ROBERT HIRSCH, OF BERLIN, GERMANY, ASSIGNOR TO THE SOCIÉTÉ ANONYME DES MATIÈRES COLORANTES ET PRODUITS CHIMIQUES DE ST. DENIS, OF PARIS, FRANCE.

BLUE DYE.

SPECIFICATION forming part of Letters Patent No. 536,626, dated April 2, 1895.

Application filed September 14, 1892. Serial No. 445,877. (Specimens.) Patented in England October 18, 1889, No. 16,448, and in Germany July 8, 1890, No. 61,504.

*To all whom it may concern:*

Be it known that I, ROBERT HIRSCH, a subject of the Emperor of Germany, residing in Berlin, Germany, have invented certain new and useful Improvements in the Manufacture of Basic Gray and Basic Blue Coloring-Matter, soluble in water, of which the following is a specification, and for which Letters Patent have been obtained as follows: in England October 18, 1889, No. 16,448, and in Germany July 8, 1890, No. 61,504.

It is well known that amido-dimethylanilin when treated cold with oxidizing agents, particularly with iron chlorid or chromic acid, is converted into a red somewhat instable compound (*Heber, Berichte der Deutschen Chemische Gesellschaft* X, 762 C. Hurster, *ibid* XII, 526, 1803) which hitherto has not been put to any practical use. The oxidation of amido dimethylanilin in alkaline solution yields another, also instable product, which can easily be obtained by forcing a continuous current of air through an aqueous solution of amido dimethylanilin. A brown precipitate is formed, whose chief characteristic is that, an intense green is formed by dissolving it in acetic acid, which however turns to yellow if water is added to the solution. The solution of the product of the oxidation in hydro-chloric acid has the same color. If the hydro-chloric acid solution be allowed to stand, it gradually oxidizes to the gray violet coloring matter described below. The same result is obtained if free amido-dimethylanilin in aqueous solution is treated with a diluted solution of chromic acid, or a solution of bichromate which has been mixed with an equivalent quantity of hydro-chloric or sulphuric acid.

The reaction is quite different if in the oxidation of the amido-dimethylanilin, first, for each molecule amido-dimethylanilin, one molecule hydro-chloric acid, or half a molecule sulfuric acid, is present and free chromic acid is used, or if, second, free amido-dimethylanilin is oxidized with a solution of chromic acid and an adequate quantity of hydro-chloric or sulfuric acid, or if, third, a bichromate solution reacts on amido-dimethylanilin with two molecules of hydro-chloric acid or one molecule sulfuric acid present. Under these circumstances, the chief result of the reaction consists of two basic coloring matters, one blue and easily soluble, the other gray violet and less soluble in water. If less than the above mentioned quantities of acid are used, the result will be partly the same as the above described product of oxidation of amido-dimethylanilin alkaline solution. Should more acid be used decomposition sets in. Instead of hydro-chloric, sulfuric or other acids; their combinations with zinc, iron or other metals may also be used.

To carry out this invention I proceed as follows: Ten kilos hydro-chlorate of nitrosodimethylanilin are suspended in seven hundred liters of water and reduced with ten kilos zinc-dust at 40°. When the solution has become colorless it is neutralized with a sufficient quantity of soda ash to show slightly alkaline if tested with tropacolin, then filtered off from the precipitated zinc and the resulting amido-dimethylanilin mixed with seven kilos hydro-chloric acid of thirty per cent., or 5.8 kilos sulfuric acid or four kilos chlorid of zinc. To the boiling solution, five kilos bichromate of potash and 4.5 kilos hydro-chloric acid, or 3.6 kilos sulfuric acid or 2.5 kilos chlorid of zinc, in one hundred liters of water, are added in one hour. It is not so advisable to treat the amido-dimethylanilin solution, which has been mixed with 11.5 kilos hydro-chloric acid, or 9.2 kilos sulfuric acid or 6.5 kilos chlorid of zinc, with bichromate solution; or to oxidize the free amido-dimethylanilin solution with a bichromate solution mixed with the same quantities of acid or chlorid of zinc.

The completion of the reaction may be recognized when a drop of the solution shows colorless instead of red on filter paper. Should this not be the case, a small quantity of bichromate solution must carefully be added. Then filter off boiling hot, cool, and precipitate the blue coloring matter in the cold solution by adding 2.5 kilos chlorzinc and one hundred kilos salt. Filter, press and dry.

The residue, containing chrome, left after filtering the hot solution, is suspended in four hundred liters of water and to which is added five kilos hydro-chloric acid. The gray violet coloring matter is then precipitated with chlorid of zinc and salt as above described. Should a shade between the two mentioned be desired, the preliminary filtering of the liquor after the reaction must be omitted and instead boil up at once with five kilos hydrochloric acid and precipitate as above.

The blue coloring matter obtained by this process is a dark blue powder, which dissolves green in concentrated sulfuric acid. It is easily soluble in water and alcohol and dyes cotton, mordanted with tannin, a very dark blue, but if mordanted with iron a deep black. It still contains small quantities of red coloring matter which may be removed by putting unmordanted cotton in the solution of the blue coloring matter. The colorings obtainable from the remaining solution are greenish blue.

The base is difficult to dissolve in water but easy to dissolve in alcohol or ether, giving a purple red color. It probably corresponds with the formula:

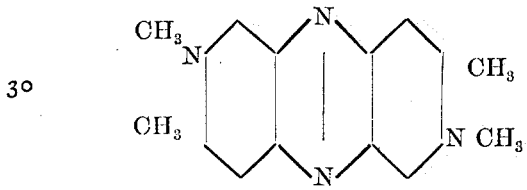

The by-product of the reaction, a gray violet coloring matter, which is obtained in larger quantities, if the addition of the oxidizing agents follows quickly or if less than one molecule of hydrochloric acid is present to one molecule of amido dimethylanilin, forms a gray violet powder only perfectly soluble in acidulated water. Its solution in concentrated sulfuric acid is a dirty brown and its solution in water a gray violet. It dyes cotton, mordanted with tannin, gray violet and will also work on unmordanted cotton.

The coloring matters, products of the described reactions, which are included in the invention, belong to a class of bodies upon whose constitution there are no precise data. Neither the base nor the salts can be crystallized, and therefore exact analysis is impossible. Nevertheless the said basic coloring matters are readily identified and distinguished from acid, azoic and other dyes. From the soluble indulins and the nitroso dyes described in Letters Patent No. 420,311, granted January 28, 1890, the new products are distinguishable, in that they do not rise upon non-mordanted cotton.

It will be remembered that where amido dimethylanilin is referred to in this specification and the following claims, the homologues and analogues of that body are included.

It will also be understood that where hydrochloric acid and chromic acid are mentioned in the following claims it is intended to include the specified equivalents thereof.

Having now particularly described and ascertained the nature of my said invention and in what manner the same is to be performed, I declare that what I claim is—

1. The described process of producing the two basic coloring matters hereinbefore specified, which process consists in oxidizing amido dimethylanilin with chromic acid in the presence of one molecule of hydrochloric acid to one molecule of amido-dimethylanilin, as set forth.

2. The described process of producing a basic blue and a basic gray violet coloring matter by oxidizing amido-dimethylanilin with a chromic salt in presence of an acid (such as hydrochloric) in the proportions specified, and then separating the two coloring matters resulting from the reaction, as set forth.

3. The described blue coloring matter obtained by the oxidation of amido-dimethylanilin, said coloring matter being characterized by solubility in water and sulfuric acid (dissolving green in the latter solvent) and by dyeing cotton a dark blue when mordanted with tannin and black when mordanted with iron, as set forth.

In witness whereof I have hereunto signed my name in the presence of two subscribing witnesses.

ROBERT HIRSCH.

Witnesses:
W. H. EDWARD,
W. HAUPT.